United States Patent [19]

Presby

[11] Patent Number: 4,710,605

[45] Date of Patent: Dec. 1, 1987

[54] LASER NIBBLING OF OPTICAL WAVEGUIDES

[75] Inventor: Herman M. Presby, Highland Park, N.J.

[73] Assignee: American Telephone and Telegraph Company, AT&T Bell Laboratories, Murray Hill, N.J.

[21] Appl. No.: 721,165

[22] Filed: Apr. 8, 1985

[51] Int. Cl.$^4$ ............................................... B23K 26/00
[52] U.S. Cl. ...................... 219/121 LJ; 219/121 LG; 219/121 LM; 219/121 LA; 350/96.1; 350/96.15; 65/2
[58] Field of Search ................. 219/121 LG, 121 LH, 219/121 LJ, 121 LN, 121 LM, 121 LY 121 LA; 350/96.15, 96.18, 96.1, 96.29; 65/3.11, 2, 4.1

[56] References Cited

U.S. PATENT DOCUMENTS

| | | | |
|---|---|---|---|
| 3,469,076 | 9/1969 | Saslawsky | 219/121 LG |
| 4,147,402 | 4/1979 | Chown | 350/96.18 |
| 4,170,726 | 10/1979 | Okuda | 219/121 LF |
| 4,356,376 | 10/1982 | Komanduri et al. | 219/121 LG |
| 4,441,008 | 4/1984 | Chan | 219/121 LF |
| 4,473,735 | 9/1984 | Steffen | 219/121 LF |

FOREIGN PATENT DOCUMENTS 0014491  1/1982  Japan ........................... 219/121 LG

OTHER PUBLICATIONS

"Laser Processing and Analysis of Materials", Plenum Press, New York, W. W. Duley, 1983, Chapter 2, pp. 171-172.
"Laser Welding and Drilling", *Society of Photo-Optical Instrumentation Engineers*, C. M. Sharp, Oct. 10-13, 1978, vol. 164, C. M. Sharp, pp. 271-278.
"Multimode Optical Fibers with Noncircular Cross Section", Radio Science, M. Brenci, P. F. Checcacci, R. Falciai, A. M. Scheggi, Jul.-Aug. 1981, pp. 535-540.

*Primary Examiner*—M. H. Paschall
*Attorney, Agent, or Firm*—Gregory C. Ranieri; Volker R. Ulbrich

[57] ABSTRACT

A fused silica glass optical fiber 10 is machined by a pulsed infrared laser beam 20 from a carbon dioxide laser 22 focussed by a germanium lens 24. The beam has a power density of about 70,000 watts per square centimeter at the focussed machining region b and is pulsed at about one pulse per second with a one-half second pulse duration. The fiber workpiece edge is gradually brought into the beam from the side to result in progressive flash evaporation.

6 Claims, 3 Drawing Figures

LASER NIBBLING OF OPTICAL WAVEGUIDES

TECHNICAL FIELD

The invention relates to micromachining of articles having a small minor dimension, particularly glass fibers used as lightguides.

BACKGROUND OF THE INVENTION

Lightguides generally consist of a very thin transparent fiber which has an inner core region and an outer cladding region, the cladding having a lower refractive index than the core. The refractive index difference between the cladding and the core may be abrupt or graded. The cladding is typically protected by a resilient jacket.

In using lightguides for lightwave communications, it is desirable to be able to couple light carried in the cores of two or more fused silica glass lightguide elements together in an efficient manner. This can be accomplished by either fusion or lapping processes. The fusion process involves bringing the fibers in close contact and then fusing them together by the application of heat while pulling to reduce the size of the assembly. The degree of optical coupling is then determined by the core-to-core spacing and the interaction length. Heat fusion of this type is difficult to control because of the relatively high temperatures involved, the small size and heat capacities of the members to be fused, and the tendency of the glass to change to a rounded geometry as soon as it becomes sufficiently softened to fuse uniformly. In the lapping process, the jacket is stripped away and the exposed fiber segment is mounted in a holder, such as a grooved block. Then the side of the cladding is abraded away by lapping to expose the core, so that it may be placed in close proximity to another, similarly exposed core for optical coupling. This approach is time consuming and permits only rather limited coupling configurations.

SUMMARY OF THE INVENTION

In accordance with the present invention, a lightguide fiber or other workpiece with relatively small minor dimensions is micromachined by pulsed laser nibbling. The workpiece is exposed to only a portion of the cross-section of a pulsed laser beam. The energy intensity of the beam and the pulse duration are adjusted so that the workpiece is progressively ablated without redeposition of the ablated material and without distortion of the remaining workpiece geometry. The novel method permits precise access to and shaping of the fiber core region and thus enables the fabrication of a variety of optical components such as taps, couplers, and mode mixers in direct fiber form.

DETAILED DESCRIPTION

Figure 1:
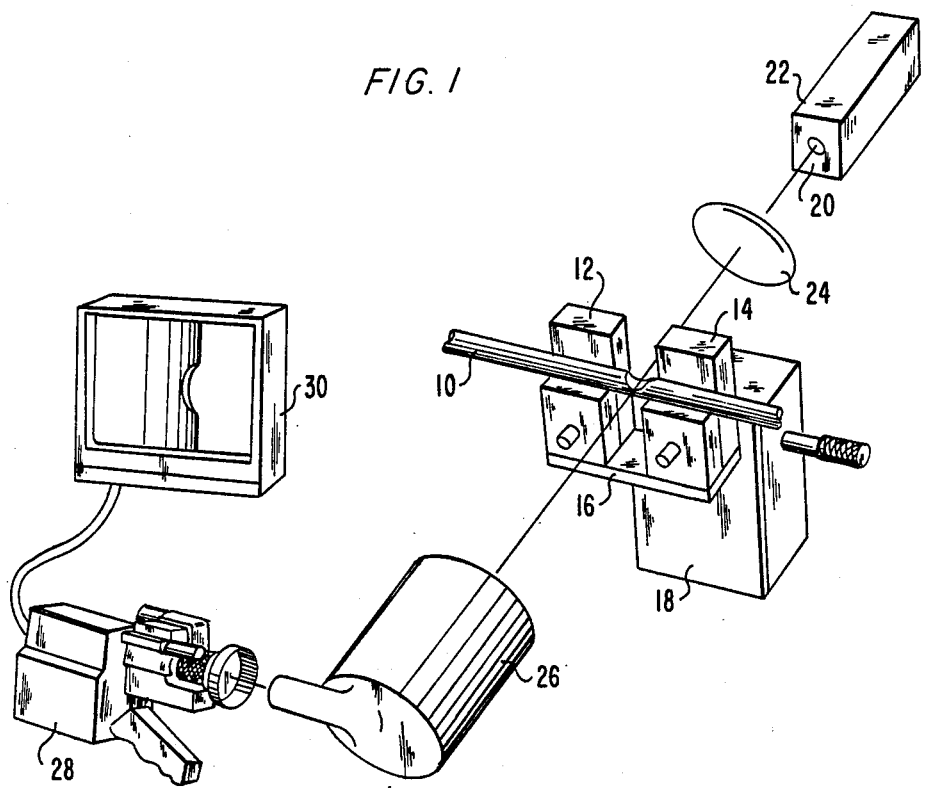
FIG. 1 shows an arrangement for micromachining an optical fiber.

FIG. 1 shows an arrangement for micromachining an optical fiber 10. The fiber 10 is held with two vacuum chucks 12, 14 which are spaced apart about 1 cm (centimeter) and held in alignment on a common base 16. The base 16 is attached to a micromanipulator 18 which can vary the position of the fiber 10 in three dimensions. The full 23 W (watt) output beam 20 of a $CO_2$ laser 22 is focused by a 13 cm focal length germanium lens 24 and is incident in a direction normal to the axis of the fiber 10. In order to selectively vaporize material from the fiber 10 without destroying the entire fiber structure, it is necessary to pulse the output of the laser 20. This is achieved by pulse modulation of the laser beam current. The fiber 10 is observed with a long-range microscope 26 coupled to a video camera 28 and monitor 30.

Figure 2:
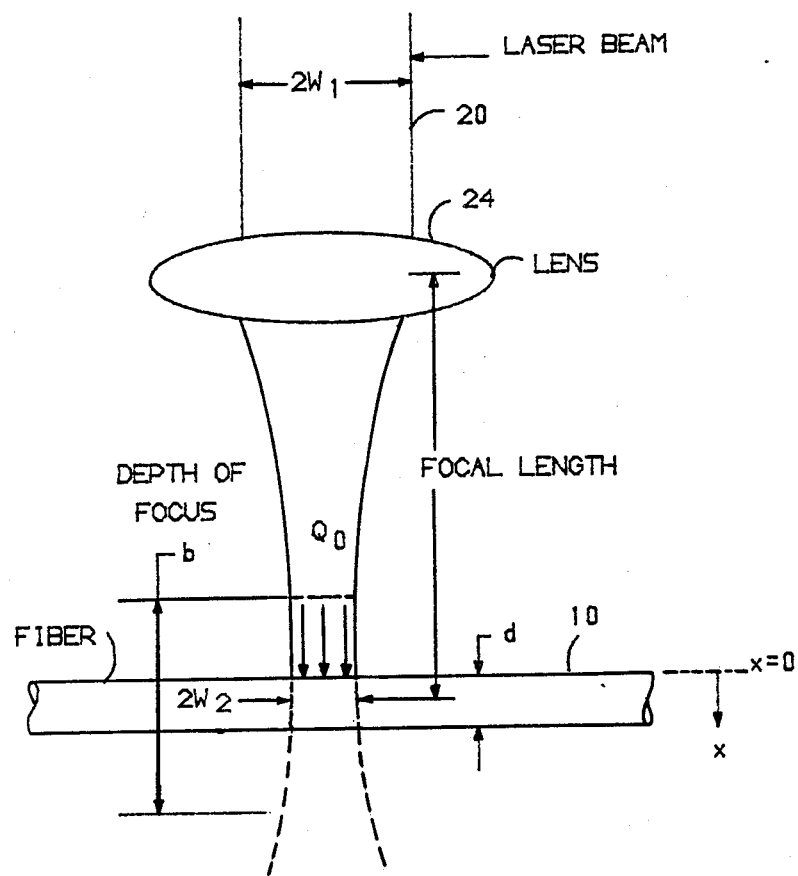
FIG. 2 is a schematic representation of the machining or nibbling region of the laser beam.

FIG. 2 is a schematic representation of the machining, or in this case the nibbling region of the beam 20. The peak power density of the beam 20 within the depth of focus region b is at least sufficient to flash evaporate, or ablate the fiber material. The pulse rate and duration of the beam 20 are chosen to suit the material parameters of the fiber 10. It is assumed that the physical properties of the fused silica fiber material remain constant and that the radiation from the fiber is negligible. Effects due to the presence of a liquid phase are ignored. The one-dimensional heat flow equation for the temperature T of the fiber 10 can be expressed as $$\frac{\partial T}{\partial t} = \alpha \frac{\partial^2 T}{\partial x^2} - \frac{4hT}{pC_p d} \quad (1)$$

where $\alpha = k/pC_p$ k is the fiber thermal conductivity $= 3.5 \times 10^{-3}$ cal/sec cm °C.,
h is the air convective heat transfer coefficient $= 1 \times 10^{-2}$ cal/sec $cm^2$ °C.
p is the fiber density $= 2.2$ $g/cm^3$,
$C_p$ is the fiber specific heat $= 0.25$ cal/g °C.,
d is the fiber diameter $= 1.5 \times 10^{-2}$ cm, and
x=0 as shown in FIG. 2 at the surface of the fiber.

Assuming that the heat flux $Q_0$ (cal/sec $cm^2$) is supplied uniformly to the fiber by laser heating, then $Q_0$ also represents the laser power density (W/$cm^2$) because nearly all of the infrared radiation of wavelength $\lambda = 10.6$ $\mu$m (micrometers) is absorbed by the fused silica material of the fiber 10. To determine the minimum power density of the laser 22 required to vaporize material, T is taken to be $T_m$, the melting point of the fiber 10, which is around 2000° C. at x=0. There is then obtained from equation (1)

$$Q_0 = 2T_m(kh/d)^{\frac{1}{2}}\{\text{erf}[(4h/pC_p d)t]^{\frac{1}{2}}\}^{-1} \quad (2)$$

Figure 3:
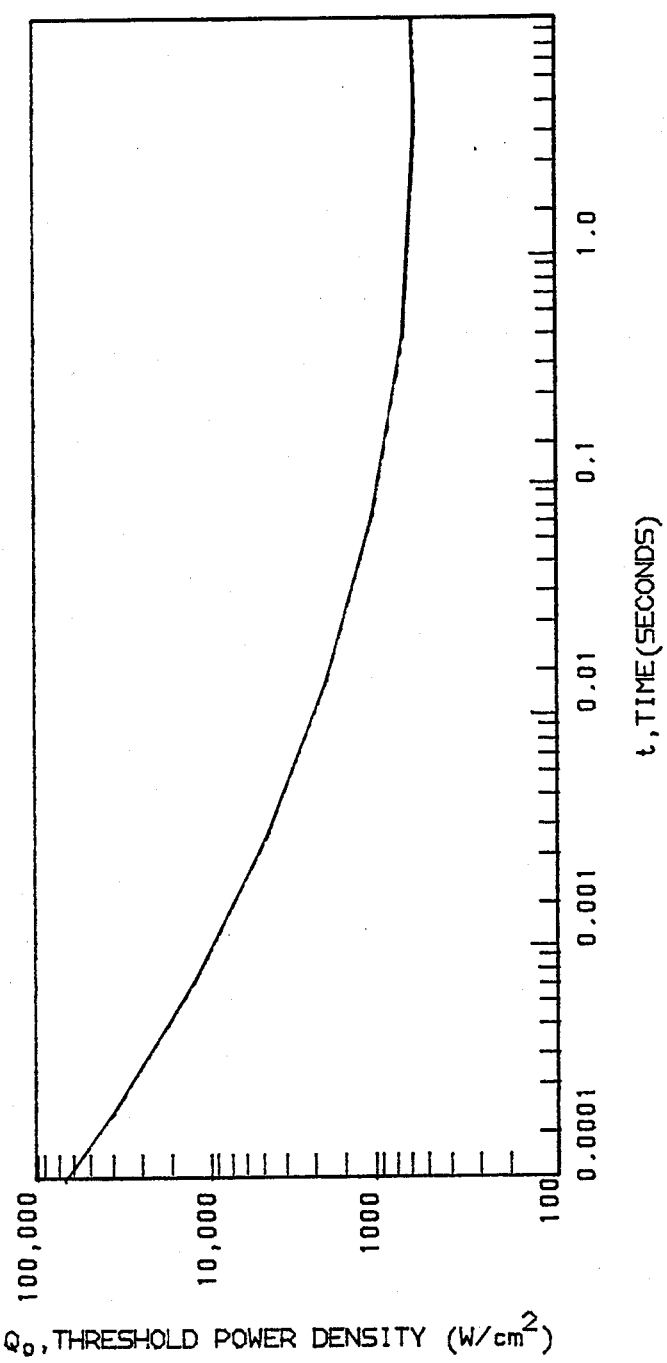
FIG. 3 is a graphical representation of heat flux versus time.

Equation 2 is plotted in FIG. 3. It is seen that the laser power density which will vaporize the fiber 10 remains constant at near 800 W/$cm^2$ if the heating time is longer than 1 sec. For the parameters of the arrangement of FIG. 1, with a laser beam diameter $2W_1 = 6.3$ mm (millimeters) and 13 cm focal length lens, the spot size $2W_2 = 300$ $\mu$m. For the 23 W output, the power density is about 70,000 W/$cm^2$. From FIG. 3 it is seen that this value results in vaporizing of the fiber 10 in times on the order of 1 ms (millisecond). It is therefore useful to limit the duration of the laser pulse to 0.5 ms, so that small amounts of material are vaporized with each pulse, with the pulse duration being short enough so that the remainder of the fiber 10 is unaffected. In addition, the laser beam 20 is not fully incident on the fiber 10. Instead, the fiber 10 is brought gradually up into the beam 20 to utilize the edges of the beam 20 to perform micromachining. The depth of focus b of the beam 20, is about 2 mm, making the exact location of the fiber 20 along the beam relatively noncritical. A pulse repetition rate of 50 pps (pulses per second) affords excellent control over material removal and effective micron depth resolution. The light transmission of the section of fiber 10 being machined is monitored to achieve even finer control.

Laser micromachining of optical fibers has the potential of generating new structures and of improving the fabrication of existing ones, especially in terms of shortened fabrication times. It takes only on the order of seconds to generate a flat area suitable for optical coupling on the fiber 10 with this technique, compared to minutes or hours required for a lapping process. The method is also well suited to a manufacturing environment and is adaptable, with the use of a small, waveguiding $CO_2$ laser to field applications.

While the invention is particularly useful for micromachining of fused silica, it will be readily apparent to those in the art that it also applies to the micromachining of other materials. The power density and pulse rate best suited for a given material can be determined by means of the relationships discussed above with respect to the equations (1) and (2).

What is claimed is:

1. A method of micromachining an optical waveguide comprising the steps of:

establishing a focussed laser beam in a machining region;

gradually moving a circumferential edge of said optical waveguide into the machining region such that at least an edge of said laser beam impinges on said circumferential edge of said optical waveguide; and pulsing said laser beam at a predetermined rate and for a predetermined pulse duration which results in the flash ablation of small portions of material along said circumferential edge of said optical waveguide upon which the laser beam impinges such that no significant redeposition of flash ablated material occurs on the optical waveguide and the geometry of the remaining optical waveguide is substantially undisturbed.

2. The method defined in claim 1 wherein the laser beam is infrared light of a wavelength highly absorbed by the material of said optical waveguide.

3. The method defined in claim 2 wherein the workpiece is comprised of fused silica glass.

4. The method defined in claim 3 wherein said optical waveguide includes an optical fiber and the power density of the laser beam in the machining region is at least about 800 watts per square centimeter.

5. The method defined in claim 4 wherein the peak power density of the laser beam in the machining region is about 70,000 watts per square centimeter and the pulse rate is at least about one per second.

6. The method defined in claim 5 wherein the pulse duration is about one-half millisecond.

* * * * *